US008198986B2

(12) United States Patent
Craik (10) Patent No.: US 8,198,986 B2
(45) Date of Patent: *Jun. 12, 2012

(54) SYSTEM AND METHOD FOR STORING AND RETRIEVING EQUIPMENT INSPECTION AND MAINTENANCE DATA

(76) Inventor: Ron Craik, Calgary (CA)

( * ) Notice: Subject to any disclaimer, the term of this patent is extended or adjusted under 35 U.S.C. 154(b) by 1050 days.

This patent is subject to a terminal disclaimer.

(21) Appl. No.: 12/102,396

(22) Filed: Apr. 14, 2008

(65) Prior Publication Data

US 2009/0051502 A1    Feb. 26, 2009

Related U.S. Application Data

(63) Continuation-in-part of application No. 11/382,664, filed on May 10, 2006, now Pat. No. 7,383,318, which is a continuation of application No. 09/986,801, filed on Nov. 13, 2001, now Pat. No. 7,076,532.

(51) Int. Cl.
*H04Q 5/22* (2006.01)
(52) U.S. Cl. .................................. 340/10.51
(58) Field of Classification Search ............. 340/10.51, 340/12.51, 13.24; 709/217; 702/184
See application file for complete search history.

(56) References Cited

U.S. PATENT DOCUMENTS

| | | | |
|---|---|---|---|
| 4,982,371 A | 1/1991 | Bolan et al. | |
| 5,091,771 A | 2/1992 | Bolan et al. | |
| 5,671,158 A | 9/1997 | Fournier et al. | |
| 5,745,049 A * | 4/1998 | Akiyama et al. | 340/870.17 |
| 5,844,473 A | 12/1998 | Kaman | |
| 5,850,209 A | 12/1998 | Lemke et al. | |
| 5,852,789 A | 12/1998 | Trsar et al. | |

(Continued)

FOREIGN PATENT DOCUMENTS

CA    2393395 A1    7/2001
(Continued)

OTHER PUBLICATIONS

Dallas Semiconductor Corporation, Cryptographic Module Security Policy for the Dallas Semiconductor DS1954B Crypto iButton TM, dated Aug. 16, 1999 (17 pages).

(Continued)

*Primary Examiner* — Vernal Brown
(74) *Attorney, Agent, or Firm* — Donald V. Tomkins (57) ABSTRACT

An inspection and maintenance data storage and retrieval system features one or more memory buttons mounted in association with an equipment item. Each memory button incorporates a uniquely identified read/write memory chip, and may comprise a contact memory button, an RFID chip, or other type of read-write memory. Technical information useful for inspection and maintenance of the equipment item, plus historical inspection and maintenance information, is stored in a central database computer remote from the equipment item. A memory button probe, used in conjunction with a portable computer, enables storage on the memory buttons of information relating to inspection and maintenance carried out on the equipment item, as well as related technical information. The portable computer is connected to the central database computer, preferably through a wireless Internet connection, thus enabling downloading of technical information from the central database to the portable computer at the point of inspection or maintenance. Information relating to each inspection and maintenance task may be downloaded to the central database computer via the portable computer. The central database computer may be a network server providing authorized users with access to current maintenance and operational status information for the equipment items supported by the system.

20 Claims, 1 Drawing Sheet

U.S. PATENT DOCUMENTS

| | | | |
|---|---|---|---|
| 5,884,202 | A | 3/1999 | Arjomand |
| 5,931,877 | A | 8/1999 | Smith et al. |
| 5,949,049 | A | 9/1999 | McCarrick et al. |
| 5,950,149 | A | 9/1999 | Fieramosca et al. |
| 6,078,874 | A | 6/2000 | Piety et al. |
| 6,101,433 | A | 8/2000 | Flicker, Jr. |
| 6,122,575 | A | 9/2000 | Schmidt et al. |
| 6,170,742 | B1 | 1/2001 | Yacoob |
| 6,216,527 | B1 | 4/2001 | Beecham et al. |
| 6,314,422 | B1 | 11/2001 | Barker et al. |
| 6,370,454 | B1 | 4/2002 | Moore |
| 6,370,455 | B1 | 4/2002 | Larson et al. |
| 6,417,760 | B1 | 7/2002 | Mabuchi et al. |
| 6,421,586 | B1 | 7/2002 | Nicoetera |
| 6,529,620 | B2 | 3/2003 | Thompson |
| 6,556,904 | B1 | 4/2003 | Larson et al. |
| 6,580,982 | B2 | 6/2003 | Sinex |
| 6,616,034 | B2 | 9/2003 | Wu et al. |
| 6,622,083 | B1 | 9/2003 | Knockeart et al. |
| 6,757,521 | B1 | 6/2004 | Ying |
| 6,778,903 | B2 | 8/2004 | Robinson et al. |
| 6,804,589 | B2 | 10/2004 | Foxford et al. |
| 6,810,406 | B2 | 10/2004 | Schlabach et al. |
| 6,859,757 | B2 | 2/2005 | Muehl et al. |
| 6,892,936 | B2 | 5/2005 | Riggert et al. |
| 7,076,532 | B2 * | 7/2006 | Craik .................... 709/217 |
| 7,383,318 | B2 * | 6/2008 | Craik .................... 709/217 |
| 7,545,274 | B2 | 6/2009 | Coop |
| 2002/0026455 | A1 | 2/2002 | Toothman, III et al. |
| 2002/0167393 | A1 | 11/2002 | Mabuchi et al. |
| 2002/0195503 | A1 | 12/2002 | Allen, Jr. et al. |
| 2003/0040873 | A1 | 2/2003 | Lesesky et al. |
| 2003/0215128 | A1 | 11/2003 | Thompson |

FOREIGN PATENT DOCUMENTS

| | | |
|---|---|---|
| WO | 0152152 A1 | 7/2001 |

OTHER PUBLICATIONS

"Problems to Spare", by Douglas W. Nelms, AirTransport World, Nov. 1998, pp. 96,99.

"MiniButtons Track Aircraft Components", Airforce, Winter 1998, p. 36.

"Knowledge of Hazardous Chemicals in the Aviation Workplace Can Help Prevent Work-related Illness and Injury", Flight Safety Foundation Aviation Mechanics Bulletin, Jul.-Aug. 1997, pp. 22-23.

"ButtonMemory Keeps it All Forever", Aviation Week & Space Technology, Oct. 19, 1998, p. 14.

"Electronic Logbook", by Paul Proctor, "Industry Outlook", Aviation Week & Space Technology, Oct. 27, 1997, p. 13.

"Paper Out, Memory In", by David Mulholland, Navy Times, Jun. 8, 1998.

"Minibuttons Used to Store Data", Overhaul & Maintenance, Jan.-Feb. 1998, p. 75.

"Automatic Identification Technology: A Cost-Effective Tool for the Configuration and Repairable Asset Manager", Florida Log '97 Proceedings Logisticians by Choice Expanding Personal Horizons, Feb. 7-8, 1997.

U.S. Appl. No. 60/231,931 (Thompson, R.), filed Sep. 11, 2000.

Dallas Semiconductor ("DS954B Crypto iButton FIPS 140-1 Non-Proprietary Cryptographic Module Security Policy", Aug. 16, 1999).

* cited by examiner

SYSTEM AND METHOD FOR STORING AND RETRIEVING EQUIPMENT INSPECTION AND MAINTENANCE DATA

CROSS-REFERENCE TO RELATED APPLICATIONS

This application is a continuation-in-part of application Ser. No. 11/382,664 filed May 10, 2006 (now U.S. Pat. No. 7,383,318), which was a continuation of application Ser. No. 09/986,801 filed Nov. 13, 2001 (now U.S. Pat. No. 7,076,532), and the disclosure of said application Ser. No. 11/382,664 is incorporated herein by reference in its entirety.

FIELD OF THE INVENTION

The present invention relates to methods and apparatus for storing and retrieving information regarding inspection and maintenance of equipment, particularly transportation equipment including aircraft, ships, and land vehicles, but also including stationary equipment items and other articles. The invention also relates in particular to methods and apparatus for storing such information on the equipment to which it pertains.

BACKGROUND OF THE INVENTION

Many types of equipment require ongoing inspection and maintenance to ensure that the equipment is in proper and safe working order. This is true for stationary industrial equipment, and also for aircraft and other mobile equipment transportation equipment. Regular inspection arid maintenance may be required not only for practical and economic reasons, but may also be mandatory for regulatory compliance. For example, in order to maintain airworthiness status, specific components and assemblies of both private and commercial aircraft must undergo inspection, plus maintenance or overhaul as required, at regulated intervals. These intervals are typically established in terms of service hours on the component in question, or service hours on the aircraft.

A commercial airliner may have dozens of components requiring regular inspection and maintenance, and this work must be performed with painstaking care by highly qualified technicians. At each inspection point, a technician must gain direct visual and physical access to the component being inspected. Gaining such access may be a complicated exercise in itself. For example, inspection hatches for rudder and elevator components on a modern jetliner may be located high above the ground, so a technician may require scaffolding or mechanized equipment(e.g., a "cherry picker") in order to gain access to such components.

Having gained access to a particular component, the technician must know exactly what steps need to be taken to inspect the component properly, and must know what maintenance or repair activities are required in the circumstances, according to the condition of the component as determined during the inspection, and the time interval since the previous inspection or maintenance procedure. Accordingly, the technician may need to have on-the-spot access to relevant provisions of the aircraft's maintenance manuals, including technical specifications and inspection checklists, as well as any work orders which may have been prepared for the specific inspection. As well, it may often be necessary or desirable to have, access to records of previous inspections, service, and maintenance.

The technician might conceivably have this information in his or her memory, but it is not desirable to rely on memory in connection with work in respect of which an error might jeopardize passenger safety. Therefore the technician may need to carry several reference documents during the inspection. If the technician has forgotten any particulars of the inspection or maintenance to be performed, or has forgotten to bring required reference documents to the point of inspection, he or she may need to leave the inspection point to obtain or retrieve the necessary information, and then return to the inspection point to complete the required inspection or maintenance service.

Once the inspection has been made, and any necessary maintenance has been completed, the technician usually will need to record certain particulars of the work; e.g., date and time of inspection, identity of the technician, and details of maintenance or repairs performed. In addition, it will typically be necessary or desirable to transfer such information to a central record-keeping facility so that the maintenance history and the current serviceability status of the aircraft can be conveniently reviewed. For many aircraft operators, such as commercial airlines and military air forces, it may be particularly efficient and desirable to have this inspection and maintenance information stored in a computer database remote from the aircraft in question, and to have the information transferred to the database as soon as possible after the inspection or maintenance work has been completed, in order to have access to up-to-the-minute information on the condition of the aircraft and its availability for service.

This desirable objective may be difficult to achieve satisfactorily where the subject information must be transferred to the central record-keeping facility from a technician's handwritten notes, because there may sometimes be a delay between the time of the inspection or maintenance and the time of entry in the central records, even when the technician acts with reasonable diligence. In other cases, the technician may inadvertently neglect or forget to enter the information until a considerable time after the inspection or maintenance was performed, and in the worst case the information may never get entered at all. In addition, there is the risk that the information in the technician's notes will be transferred inaccurately or incompletely, not to mention the further risk that the information might be lost completely if the technician's notes are accidentally misplaced or destroyed before the information transfer can be carried out.

Because of factors such as those outlined above, security and storage of information related to inspection and maintenance of aircraft and other types of equipment, as well as timely access to information required for such inspection and maintenance, can be inconvenient and inefficient, and correspondingly time-consuming and expensive. One example of prior attempts to address these problems is U.S. Pat. No. 5,931,877, issued on Aug. 3, 1999 to Smith (et al.), which discloses a system providing electronic access to a central data warehouse which stores information from technical manuals relating to the various pieces of equipment being supported, by the system, as well as historical maintenance information for specific pieces of equipment. Maintenance technicians may acquire access to the information in the central data warehouse by use of a hand-held computer, or portable maintenance aid ("PMA"), via wireless transceivers or high-speed land lines. The technicians therefore do not need access to hard copies of the technical and historical maintenance information for the equipment they are working on, and they can transmit data regarding their maintenance tasks back to the central data warehouse through use of the PMA.

The PMA forms part of a fundamental element of the Smith system, namely, a test means for identifying; failed equipment components. More specifically, the test means provides for automated downloading, to the PMA, of built-in test (or "BIT") data available from a bus in particular equipment units such as sophisticated military aircraft and weaponry components. Accordingly, the. Smith system's practical usefulness is therefore best found in association with such specialized equipment adapted for BIT logic analysis, and it is not readily and economically adaptable for use with other types of equipment. Perhaps the most significant drawback of the Smith system, however, is the fact that technicians' work will be seriously hampered or delayed in the event of breakdown of communications with the central data warehouse, which will typically be the technicians' only convenient source of reliable technical and historical information which may be needed to complete, a particular maintenance task.

For the foregoing reasons, there is a need for a method and apparatus for recording and storing inspection and maintenance information in a central data storage facility promptly upon completion of the, inspection or maintenance work, without requiring transfer of the information from handwritten notes. In addition, there is a need for a method and apparatus for providing paperless access to inspection and maintenance reference information, such as information in technical service manuals, or historical inspection and maintenance information, directly at the point of inspection or maintenance. Furthermore, there is a need for a method and apparatus for storage of technical and historical inspection and maintenance information directly on the equipment in question, preferably in the immediate vicinity of the point of inspection or maintenance. The present invention is directed to these needs.

BRIEF SUMMARY OF THE INVENTION

In general terms, the present invention provides a system and method whereby a technician performing equipment inspection or maintenance services, particularly mobile equipment such as aircraft, can have direct paperless access, at the actual point of inspection or maintenance, to historical maintenance records and reference information pertinent to the equipment item (i.e., an equipment unit or equipment component) being inspected or serviced. In accordance with the invention, such records and information are stored in a central database remote from the equipment item, and the technician may access the database, using portable computing means linked to the database. In addition, a portion of the pertinent records and information may be stored in one or more memory buttons mounted in or on the equipment item, preferably in locations conveniently proximate to corresponding points of regular inspection and maintenance. As well, the information maybe stored in the memory of the portable computing means.

As used in this patent specification, the term "memory button" refers to a memory device incorporating a uniquely identified memory chip having read-write capability, with the chip memory being accessible(for purposes of reading data from or writing data to the chip memory) by means of an appropriate memory-button probe actuated within the "probe range" of the memory button. The magnitude of the "probe range" will vary according to the particular type Of memory button used, and the particular requirements of the inspection or maintenance task to be performed. In general terms, however, the probe range corresponds to the lesser of the following distance criteria:

(a) the maximum distance away from the memory button at which the appropriate memory button probe can be actuated to access the memory button's chip memory while ensuring reliably complete and accurate data transfer to and/or from the chip memory via the memory button probe: and (b) the maximum distance, away from the memory button which is sufficiently close to the equipment item that is the subject of the inspection or maintenance task in question, to permit the reasonable conclusion that the person actuating the memory button probe had sufficient access to the equipment item to perform the inspection or maintenance task.

Accordingly, an appropriate probe range will be determined, and the appropriate type of memory button, will be determined or selected to suit the particular requirements of a given inspection or maintenance task. Distance criterion (a) will be technology-dependent dependent, whereas distance criterion (b) will be task-dependent. For example, proper inspection of some equipment components will require the inspector to acquire very close access to the component; in such cases, distance criterion (b) will dictate a comparatively small probe range—and perhaps approaching zero. In another case, it might be possible, to complete the inspection task by visual inspection from a distance of 5 feet, which would then represent distance criterion (b). In yet another example case, where the inspection task is to confirm the operational status of lighting fixtures on a highway bridge, the task could be satisfactorily performed from the roadway, without having to acquire close access to the fixtures themselves. In such a case, distance criterion (b) would be comparatively large, such that distance criterion (a) would be the critical factor in determining the probe range applicable to the task in question.

For purposes of the present invention, the maximum practical magnitude of the probe range may be taken as 30 feet.

One example of a memory button in the context of the present invention would be a "contact" memory button (or "CMB"), the read-write memory of which can be accessed only by physical contact with a corresponding memory button probe. It will be readily appreciated, having regard to the immediately preceding discussion, that the probe range will be zero for inspection or maintenance tasks relating to an equipment item having an associated memory button comprising a CMB.

Another example of a memory button would be a read-write Radio Frequency Identification (or "RW-RFID") chip, incorporating a transponder, antenna, memory, and software (or firmware) to facilitate the read-write functions and wireless data transfer at selected (and permitted) frequencies within the radio-frequency (RF) range of the electromagnetic wave spectrum. In embodiments of the present invention using memory buttons comprising RW-RFID chips, the memory button probe would typically be in the form of a handheld RFID transponder. The applicable probe range for a given task could be comparatively high, since comparatively high values of distance criterion (a) would be possible with the use of RW-RFID chips. Accordingly, the use of memory buttons comprising RW-RFID chips would be particularly advantageous for inspection tasks that can be accomplished at a distance from the equipment unit or component in question. Conversely, in cases where distance criterion (b) is the controlling factor in determination of the appropriate probe range, the use of memory burtons comprising RW-RFID chips would require RW-RFID chips adapted to permit data transmission over short distances only.

A memory button for purposes Of the present invention could alternatively comprise other types of devices having read-write memory chips or other forms of read-write memory. Examples of such alternative devices would include, but not be limited to, "smart cards", chip cards, and integrated circuit cards (ICCs).

Preferably, each memory button is enclosed within a protective casing, to provide increase sturdiness and durability, and to provide protection from electromagnetic interference that could alter the chip memory or interfere with data transfer to or from the chip memory. Preferably, the protective casing will be made of metal, such as stainless steel.

In accordance with the invention, the technician may use a memory button probe, electronically linked to the portable computing means, to read the information stored on the memory buttons, and also to record new information on the memory buttons relating to the inspection or maintenance task carried out by the technician on the occasion in question. The technician may then update the central database by transferring the information on the memory buttons to the database via the memory button probe and the portable computing means. Because the database is updated promptly upon completion of each inspection and maintenance task, persons accessing the database may obtain up-to-the-minute information regarding the equipment item's state of maintenance and its availability for deployment.

Accordingly, in one aspect the present invention is a system for accessing and storing data pertaining to inspection and maintenance of an equipment item, said system comprising:
  (a) one or more memory buttons, each said memory button being adapted to permit electronic storage of data therein, and to permit reading of data stored therein;
  (b) a memory button probe, said probe being adapted for transferring data to, and for reading data stored in, the said one or more memory buttons;
  (c) portable computing means having a memory;
  (d) first data transfer means, whereby the portable, Computing means is in electronic communication with the memory button probe;
  (e) a central computer having a database for storing data relating to the equipment item, said central computer being at a location remote from the equipment item; and
  (f) second data transfer means, whereby the portable computing means is in electronic communication with the central computer and database;
wherein each memory button is mounted on, in, or near the equipment item.

The portable computing means may be a laptop computer, but in the preferred embodiment of the system, the portable computing means will be a "personal digital assistant", or PDA. The second data transfer means may be a physical electronic connection, or it may be in the form of a wireless connection. In the preferred embodiment, the second data transfer means will be a wireless connection via a computer network such as the Internet, with data transmissions across such connection being password-protected and encryptable. In a further embodiment, the second data transfer means will be a connection through a telecommunications satellite system.

In the preferred embodiment of the system, the central computer will be a network server accessible to authorized user computers through a computer network, which may be a local area network (LAN), or a wide area network (WAN) such as the Internet. In the preferred embodiment, the network server will be protected by a firewall to prevent intrusion into the server by hackers. As well, access to the network server by authorized user computers will be password-protected.

In another aspect, the invention is a method of storing and retrieving inspection and maintenance information regarding an equipment item, said method comprising the steps of:
  (a) providing a memory button, said memory button being adapted to permit electronic storage of data therein, and to permit reading of data stored therein;
  (b) installing said memory button on or in the equipment item in convenient proximity to a selected inspection and maintenance point;
  (c) providing a memory button probe adapted for transferring data to, and for reading data stored in, the memory button;
  (d) providing portable computing means having a memory, and having a first data transfer means whereby said portable computing means is in electronic communication with the memory button probe;
  (e) providing, at a location remote from the equipment item, a central computer having a database, said central computer having a second data transfer means whereby the central computer is in electronic communication with the portable computing means;
  (f) as desired, storing technical information relating to the equipment item in the database of the central computer;
  (g) as desired, storing technical information relating to the equipment item in the memory button;
  (h) as desired, engaging the memory button probe with the memory button, so as to read selected data stored therein, and to transmit said selected data via said first data transfer means to the portable computing means;
  (i) as desired, transmitting a signal from the portable computing means to the central computer via said second data transfer means, instructing the central computer to transmit selected data from the database to the portable computing means via the second data transfer means;
  (j) performing an inspection or maintenance task on the equipment item;
  (k) entering task performance information into the portable computing means relating to the performance, of said inspection or maintenance task;
  (l) electronically transmitting a signal, corresponding to said task performance information, from the portable computing means to the memory button, via said first data transfer means and the memory button probe, so as to store said task performance information ,on the memory button; and
  (m) electronically transmitting a signal, corresponding to said task performance information, from the portable computing means to the central computer, via said second data transfer means, so as to store said task performance information in the database.

The portable computing means may be a laptop computer, but in the, preferred embodiment of the method, the portable computing means will be a PDA. The second data transfer means may be a physical electronic connection, or it may be in the form of a wireless connection. In the preferred embodiment, the second data transfer means will be a wireless connection via a computer network such as the Internet, with data transmissions across such connection being password-protected and encryptable. In a further embodiment, the second data transfer means will be a connection through a telecommunications satellite system.

In the preferred embodiment of the method, the central computer will be a network server accessible to authorized user computers through a computer network, which may be a local area network (LAN), or a wide area network (WAN) such as the Internet. In the preferred embodiment, the network server will be protected by a firewall to prevent intrusion info the server by hackers. As well, access to the network server by authorized user computers will be, password-protected. Accordingly, in the preferred embodiment, the method of the invention further comprises the step of accessing the database of the computer network server from a user computer via connection to a computer network, plus the step of making a back-up copy of information from the database on the user computer.

In preferred embodiments, data transfer to and from the memory of the memory chips, via the memory chip probe, will he password-protected and eneryptable.

In a further aspect, the invention is a method for verifying physical access by an inspection agent to an equipment item, said method comprising the steps of:
(a) providing a memory button comprising a read-write memory chip sealed, said memory chip having stored therein a unique and unalterable identification number;
(b) associating the memory chip's unique identification number with the equipment item;
(c) affixing the memory button to the equipment item;
(d) providing portable computing means having a read-write memory and a user interface whereby user-defined data and commands may be entered into said read-write memory;
(e) providing a memory button probe in electronic communication with the portable computing means, said memory button probe being adapted for electronic communication with the memory chip of the memory button, so as to transfer data from the portable computing means to the memory chip or from the memory chip to the portable computing means;
(f) associating a unique inspector code with a specific inspection agent;
(g) gaining physical access to the, memory button, while carrying both the portable computing means and the memory button probe;
(h) by means of the user interface, entering the unique inspector code into the memory of the portable computing means; and
(i) actuating the memory button probe so as to record:
i.1 in the read-write memory of the memory chip, the/ unique inspector code, plus the date and time; and
i.2 in the memory of the portable computing means, the memory chip's unique identification number, plus the time and date.

The method for verifying physical access to an equipment item may additionally comprise the subsequent steps of:
(j) performing a selected inspection or maintenance task on the equipment item;
(k) by means of the user interface, entering task performance information into the portable computings means relating to the completed performance of the selected inspection or maintenance task; and
(l) actuating the memory button probe so as to electronically transmit a signal, corresponding to said task performance information, from the portable computing means to the memory button, and so as to store said task performance information on the memory button's read-write memory chip.

In addition, the method for verifying physical access may also comprise the further and subsequent steps of:
(m) providing, at a location remote from the equipment item, a central computer having a database, said central computer being in electronic communication with the portable computing means; and
(n) transmitting a signal from the portable computing means to the central computer, so as to store said task performance information in said database;

wherein:
(o) the equipment item has no onboard means for reading information stored in the memory button;
(p) steps (g), (h), (i), (j), (k), and (l) are performed by the specific, inspection agent referred to in step (f); and
(q) the database of the central computer stores technical information, relating to the selected equipment item.

In preferred embodiments, the method for verifying physical access may also comprise the additional step of transmitting a signal from the portable computing means to the central computer, instructing the central computer to transmit, from the database to the portable computing means, selected technical information relating to the equipment item.

The memory button or buttons used in conjunction with the present invention may be provided in the form contact memory buttons, as previously defined herein. Alternatively, the memory buttons may be memory devices incorporating read-write RFID chips. Further alternative forms of memory button may include other types of memory devices incorporating read-write memory chips or other forms of read-write memory, such as "smart cards", Chip cards, and integrated circuit Cards (ICCs).

BRIEF DESCRIPTION OF THE DRAWING

Embodiments of the invention will now be described with reference to the accompanying figure, in which numerical references denote like parts, and in which.

DETAILED DESCRIPTION OF THE PREFERRED EMBODIMENT

Figure 1:
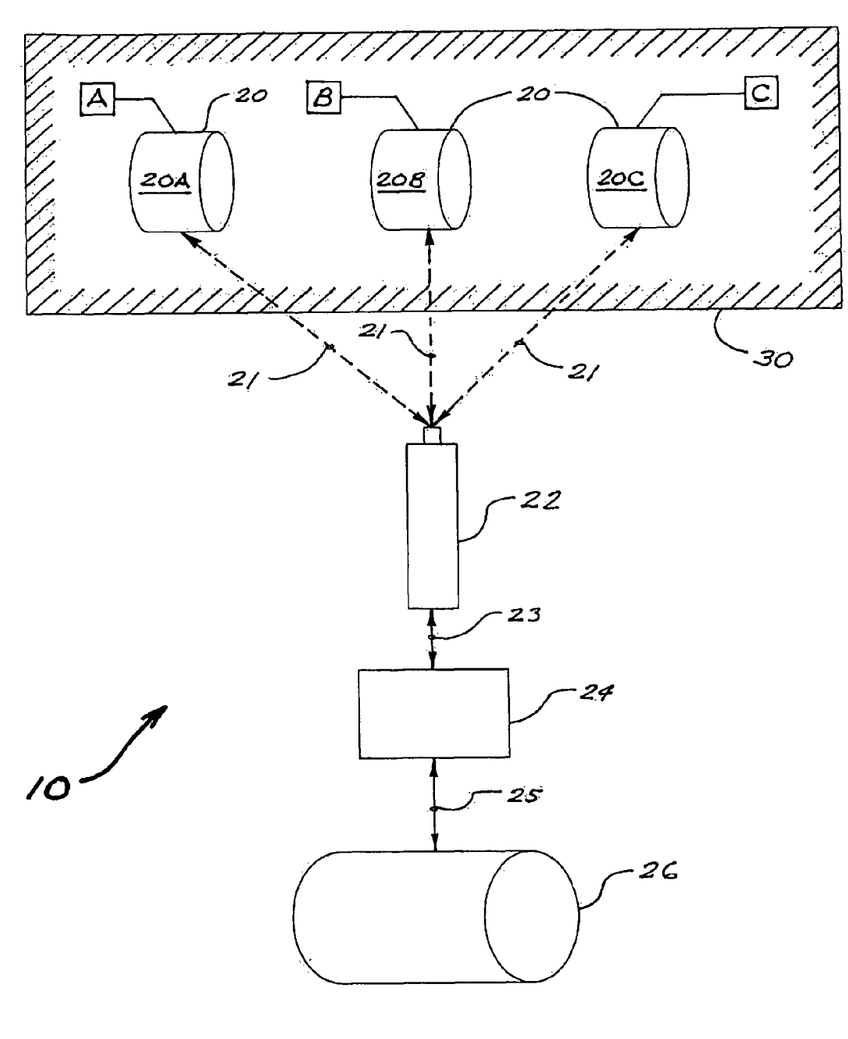
FIG. 1 is a schematic block diagram of an equipment inspection and maintenance data storage and retrieval system according to the present invention.

Referring to FIG. 1, the system of the present invention, conceptually indicated by reference numeral 10, includes one or more read/write memory buttons 20 installed at selected locations in, or, or near an equipment item 30. As previously discussed herein, memory buttons 20 may be provided in various alternative forms. The memory buttons 20 are memory devices each incorporating a memory chip—preferably sealed in a protective container (preferably made of stainless steel)—with each chip having a unique and unalterable identification number recorded directly onto the chip. The memory buttons 20 used for purposes of the present invention have "read/write" chips; i.e., the chips have a memory which can be read, and data can also be written into the memory.

Memory buttons are available with variable features and capabilities. One example is the "iButton" (™) manufactured by Dallas Semiconductor Corp. The, iButton being an example of a "contact" memory button, which requires direct contact with a compatible memory button probe to transfer data to or from the memory button. Memory buttons for use with the present invention could also be memory devices incorporating read/write RFID chips, the memories of which are wirelessly accessed for purposes of data transfer, rather than requiring direct contact with a memory button probe. For convenience, specific embodiments of the present are described herein in the context of contact memory buttons by way of example, but persons of ordinary skill in the art will readily appreciate that these descriptions are adaptable and applicable in general principle to alternative embodiments that use "non-contact" styles of memory buttons (e.g., wireless data transfer via electromagnetic waves, in the case of RFID chips).

Reading the memory buttons 20 and writing new data onto them is accomplished using a suitable memory button probe 22 connected to portable computing means. One known example of a memory button probe is the "Blue Dot Receptor" (™) manufactured by Dallas Semiconductor Corp. Each memory button 20 has a contact means which, when engaged by a corresponding contact means associated with the memory button probe 22, creates a data transfer link whereby data stored, in the memory button 20 may be read, or whereby data may be transferred to the memory button 20. In FIG. 1, engagement between the corresponding contact means of the memory button probe 22 and a selected memory button 20, as well as the resulting transfer of data to Or from the memory button 20, is conceptually denoted by the broken lines indicated by reference numeral 21.

The system 10 includes portable computing means 24 having a memory, and the portable computing means 24 is electronically connectable to the memory button reader 22 by way of a first data transfer means 23. The first data transfer means 23 may be an integral component of the memory button reader 22, or it may be a separate wired connection. The portable computing means 24 may be a laptop computer. However, in the preferred embodiment, the portable computing means 24 will be a hand-held computing device such as a PDA. Several types of PDAs are readily available, such as the PALM PILOT line of products manufactured by Palm, Inc. Whatever form the portable computing means 24 may assume, it is programmed with software appropriate to enable receipt of information from the memory buttons 20 via the memory button reader 22, and to enable transfer of information to the memory buttons 20 via the memory button reader 22.

Also provided is a central database computer 26, which is connectable to the portable computing means 24 by way of a second data transfer means 25. In the preferred embodiment, the central database computer 26 will be a Internet server, and may be located remotely from the equipment item 30. The central database computer 26 is configured and programmed to receive and store data relating to the equipment item 30, including technical specifications and procedural information from operation and maintenance manuals for the equipment item 30, plus historical information regarding previous inspections and maintenance work carried but in connection with the equipment item 30. As well, the central database computer 26 can receive signals from the portable computing, means 24 via the second data transfer means 25 requesting information from the database to be downloaded to the portable computing means 24. In the preferred embodiment, both the portable computing means 24 arid the central database computer 26 are programmed with encryption and decryption software to maximize security of data transmissions.

The second data transfer means 25 may be a hard-wired connection to the central database computer 26, either directly or through a computer network such as the Internet. In the preferred embodiment, the second data transfer means 25 will be a wireless link via the Internet. In another embodiment, the second data transfer means 25 will be a wireless communications link through a telecommunications satellite system.

In the preferred embodiment, the central database computer 26 will be a network server accessible to computers of authorized users through a computer network, which may be a local area network (LAN), or a wide area network (WAN) such as the Internet. In the preferred embodiment, the network server will be protected by a firewall to prevent intrusion by hackers. As well, access to the network server by authorized user computers will be password-protected.

The operation and advantages of the method of the present invention may be readily understood from the following description. One or more memory buttons 20 are installed at selected locations in or on an equipment item 30. The equipment item 30 may be any piece of equipment, but the invention has particularly beneficial application to mobile equipment items such as aircraft. As used in this patent document, the term "aircraft" is to be understood as encompassing any manmade apparatus capable of powered or unpowered flight through the air or space, including but not limited to airplanes, helicopters, missiles, rockets, and spacecraft. Advantageously, the memory buttons 20 may be installed in locations proximate to components on the equipment item 30 which require inspection or maintenance at particular intervals. A typical commercial airliner, for instance, has a large number of components which must be inspected, and serviced as necessary, on a regular basis in order to maintain the aircraft's airworthiness status. The unique identification number of each memory button 20 may be recorded (in the central database computer 26, for example) as correlating to a specific component or location on the equipment item 30. For exemplary purposes, if memory buttons are installed in association with components A, B, and C of a particular equipment item 30, the memory button associated with component A may be referred to as memory button 20A, the memory button associated with component B may be referred to as memory button 20B, and so on, as indicated in FIG. 1.

When a technician wishes to inspect or service component A, he or she, gains access to component A as appropriate. In some cases, the technician's task may simply be to inspect component A and record the fact that this inspection has been carried out, and this recording function is completed easily in accordance with the present method. The technician engages the contact means of the memory button probe 22 with the contact means of memory button 20A, whereupon data will be written onto memory button 20A, including the date and time of contact, as well as the identity of the technician. For this purpose, the technician may be assigned ah identifier, such as a password which must be entered into, the portable computing means 24 in order to use the. memory button probe 22. However, other ways of identifying individual technicians or users will be readily apparent to those skilled in the art, without departing from the essential concept Of the invention. Continuing with the example, the information recorded onto memory button 20A may also be downloaded to the central database computer 26, by corresponding commands entered on the portable computing means 24, which is programmed with software appropriate for execution of such functions.

In a particular situation, the technician may need to complete a specific maintenance task on component A, and to make detailed, records of such task. In accordance with the invention, the technician may complete the task and then make corresponding entries on the portable computing means 24, which entries are then written onto memory button 20A by means of the memory button probe 22, and also downloaded to the central database computer 26. Accordingly, the next time a technician comes to inspect or service component A, a detailed record of previous inspections and maintenance in Connection with component A will be available to the technician on the spot, by downloading the information stored in memory button 20A to the portable computing means 24. This information may also be available from the central database computer 26. However, a distinct advantage of the present invention is that such historical information will always be available right at the point of inspection, even if the second data transfer, means 25 or the central database computer 26, or both, happen to be inoperative for any reason.

It will commonly be necessary or desirable for a technician to make reference to technical information (such as information contained in maintenance manuals for the equipment item 30) either before or during performance of a particular inspection or maintenance task. For example, the technician may wish to confirm technical specifications to which a particular component has to be set, to study electrical wiring diagrams, or to determine or confirm procedural steps which need to be followed to complete the task at hand. In accordance with the present invention, the technician may obtain prompt access to the required information by sending a corresponding request message from the portable computing means 24 to the central database computer 26, which in turn downloads the requested information to the portable computing means 24 whereon it may be viewed by the technician. In this way, the invention substantially eliminates the need for inspection and maintenance technicians to have access to hard copies of technical and maintenance manuals, which can be quite voluminous for complex equipment units, such as commercial aircraft.

In addition, if the technician so desires, selected information downloaded from the central database computer 26 may written onto the memory buttons 20 so that it will be conveniently available to the next technician who performs inspection or maintenance on the component or components in question. The requirement or desirability of downloading reference information from the central database computer 26 for purposes of subsequent inspection or maintenance tasks may thus be reduced if not eliminated, facilitating even more convenient and expeditious execution of such tasks. Moreover, as with historical inspection and maintenance information previously discussed, downloading reference information to the memory buttons 20 provides the additional benefit that such information will always be available right at the point of inspection, even if the second data transfer means 25 or the central database computer 26, or both, happen to be inoperative for any reason. Such information may also be stored in the memory of the portable computing means 24, thus creating a further back-up copy.

In the preferred embodiment, the central database computer 26 is a network server which may be accessed by authorized users via a computer network such as the Internet. Accordingly, art authorized user may conveniently download and view up-to-date inspection and maintenance and operational status information relating to any particular equipment item associated with the system, by connecting to the network server front a user computer virtually anywhere in the world. In addition, such authorized user may make a back-up copy of such information, thus providing even further assurance that the information will be preserved and available as needed.

In the preferred embodiment, a technician in the field will thus have direct access to the internet, thereby obtaining a number of practical benefits. In addition to having access to technical and historical information in the central database, the technician may search other helpful resources accessible via the Internet, directly and conveniently from the portable computing means 24 which the technician has during inspection or maintenance work, even if such work is being carried out from high on a scaffold or some other unusual position. As well, the technician is able to communicate via electronic mail ("E-mail") via the portable computing means, which may be advantageous for purposes including ordering spare parts needed for the task at hand, or for seeking case-specific advice and guidance from other technical personnel who may be far away from the site of the work.

Although the present invention has been described herein, by way of example, in the context of practical application in association with aircraft, persons, skilled in the art will understand that the described concepts and embodiments are readily adaptable for use with other types of equipment units or components thereof. For example, the invention may be adapted for use in association with ships or components thereof (the term "ship" being understood as applying to any manmade vessel for travelling over, through, or under water). In an exemplary military application, the invention could be adapted for use with mobile weaponry units such as, but not limited to, artillery pieces, tanks, bombs, and other munitions. The invention may also be beneficially adapted for use with equipment and equipment components forming part of stationary installations, which would include but not be limited to fixed structures such as buildings, industrial plants, and bridges.

It will be readily appreciated by those skilled in the art that various modifications of the present invention may be devised without departing from the essential concepts and principles of the invention, and all such modifications are intended to be included in the scope of the claims appended hereto. It is to be especially understood that the invention is not intended to be limited to illustrated embodiments, and that the substitution of a variant of a claimed element or feature, without any substantial resultant change in the working of the invention, will not constitute a departure from the scope of the invention.

In this patent document, the word "comprising" is used in its non-limiting sense to mean that items following that word are included, but items not specifically mentioned are not excluded. A reference to an element by the indefinite article "a" does not exclude the possibility that more than one of the element is present, unless the context clearly requires that there be one and only one such element.

What is claimed is:

1. A method for verifying physical access by an inspection agent to an equipment item, said method comprising the steps of:
   (a) providing a memory button comprising a read-write memory chip, said memory chip having stored therein a unique and unalterable identification number;
   (b) associating the memory chip's unique identification number with the equipment item;
   (c) affixing the memory button to the equipment item;
   (d) providing portable computing means having a read-write memory and a user interface whereby user-defined data and commands may be entered into said read-write memory;
   (e) providing a memory button probe in electronic communication with the portable computing means, said memory button probe being adapted for electronic communication with the memory chip of the memory button, so as to transfer data from the portable computing means to the memory chip or from the memory chip to the portable computing means;
   (f) associating a unique inspector code with a specific inspection agent;
   (g) gaining physical access to the memory button, while carrying both the portable computing means and the memory button probe;
   (h) by means of the user interface, entering the unique inspector code into the memory of the portable computing means; and
   (i) actuating the memory button probe so as to record:
      i.1 in the read-write memory of the memory chip, the unique inspector code, plus the date and time; and
      i.2 in the memory of the portable computing means, the memory chip's unique identification number, plus the time and date.

2. The method of claim 1, comprising the further and subsequent steps of:
(j) performing a selected inspection or maintenance task on the equipment item;
(k) by means of the user interface, entering task performance information into the portable computing means relating to the completed performance of the selected inspection or maintenance task; and
(l) actuating the memory button probe so as to electronically transmit a signal, corresponding to said task performance information, from the portable computing means to the memory button, and so as to store said task performance information on the memory button's read-write memory chip.

3. The method of claim 2, comprising the further and subsequent steps of:
(m) providing, at a location remote from the equipment item, a central computer having a database, said central computer being in electronic communication with the portable computing means; and
(n) transmitting a signal from the portable computing means to the central computer, so as to store said task performance information in said database;
wherein:
(o) the equipment item has no onboard means for reading information stored in the memory button;
(p) steps (g), (h), (i), (j), (k), and (l) are performed by the specific inspection agent referred to in step (f); and
(q) the database of the central computer stores technical information relating to the selected equipment item.

4. The method of claim 3 comprising the additional step of transmitting a signal from the portable computing means to the central computer, instructing the central computer to transmit, from the database to the portable computing means, selected technical information relating to the equipment item.

5. The method of claim 1 wherein the memory button comprises a read-write RFID chip.

6. The method of claim 2 wherein the memory button comprises a read-write RFID chip.

7. The method of claim 3 wherein the memory button comprises a read-write RFID chip.

8. The method of claim 4 wherein the memory button comprises a read-write RFID chip.

9. The method of claim 4, comprising the additional step of transferring said technical information from the portable computing means to the memory button by engaging the contact means of the memory button probe with the contact means of the memory button.

10. The method of claim 8, comprising the additional step of transferring said technical information from the portable computing means to the memory button by engaging the contact means of the memory button probe with the contact means of the memory button.

11. The method of claim 1 wherein the memory button stores technical information relating to the equipment item, and wherein the method comprises the additional step of downloading selected technical information from the memory button, for use in association with the selected inspection or maintenance task, by engaging the contact means of the memory button probe with the contact means of the memory button.

12. The method of claim 1 wherein the equipment item is a component of a stationary installation.

13. The method of claim 12 wherein the stationary installation is a stationary equipment unit.

14. The method of claim 12 wherein the stationary installation is a fixed structure.

15. The method of claim 1 wherein the equipment item is a component of a mobile equipment unit.

16. The method of claim 15 wherein the mobile equipment unit is a ship.

17. The method of claim 16 wherein the mobile equipment unit is an aircraft.

18. The method of claim 16 wherein the mobile equipment unit is a weaponry unit.

19. A method for verifying physical access by an inspection agent to an equipment item, said method comprising the steps of:
(a) providing a memory button comprising a read-write memory chip, said memory chip having stored therein a unique and unalterable identification number;
(b) associating the memory chip's unique identification number with the equipment item;
(c) affixing the memory button to the equipment item;
(d) providing portable computing means having a read-write memory and a user interface whereby user-defined data and commands may be entered into said read-write memory;
(e) providing a memory button probe in electronic communication with the portable computing means, said memory button probe being adapted for electronic communication with the memory chip of the memory button, so as to transfer data from the portable computing means to the memory chip or from the memory chip to the portable computing means;
(f) associating a unique inspector code with a specific inspection agent;
(g) gaining physical access to the memory button, while carrying both the portable computing means and the memory button probe;
(h) by means of the user interface, entering the unique inspector code into the memory of the portable computing means; and
(i) actuating the memory button probe so as to record:
i.1 in the read-write memory of the memory chip, the unique inspector code, plus the date and time;
i.2 in the memory of the portable computing means, the memory chip's unique identification number, plus the time and date;
(j) performing a selected inspection or maintenance task on the equipment item;
(k) by means of the user interface, entering task performance information into the portable computing means relating to the completed performance of the selected inspection or maintenance task;
(l) actuating the memory button probe so as to electronically transmit a signal, corresponding to said task performance information, from the portable computing means to the memory button, and so as to store said task performance information on the memory button's read-write memory chip;
(m) providing, at a location remote from the equipment unit, a central computer having a database, said central computer being in electronic communication with the portable computing means; and
(n) transmitting a signal from the portable computing means to the central computer, so as to store said task performance information in said database;
wherein:
(o) the equipment unit has no onboard means for reading information stored in the memory button;
(p) steps (g), (h), (i), (j), (k), and (l) are performed by the specific inspection agent referred to in step (f); and (q) the database of the central computer stores technical information relating to the selected equipment item.

20. The method of claim 19 comprising the additional step of transmitting a signal from the portable computing means to the central computer, instructing the central computer to transmit, from the database to the portable computing means, selected technical information relating to the equipment item.

* * * * *